Figure 1:
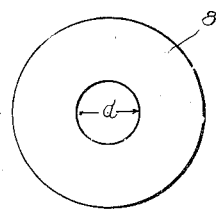

June 11, 1935.  L. THIRY  2,004,712

ELASTIC SHAFT COUPLING

Filed Feb. 26, 1931   2 Sheets-Sheet 1

Leon Thiry
INVENTOR

BY
his ATTORNEY

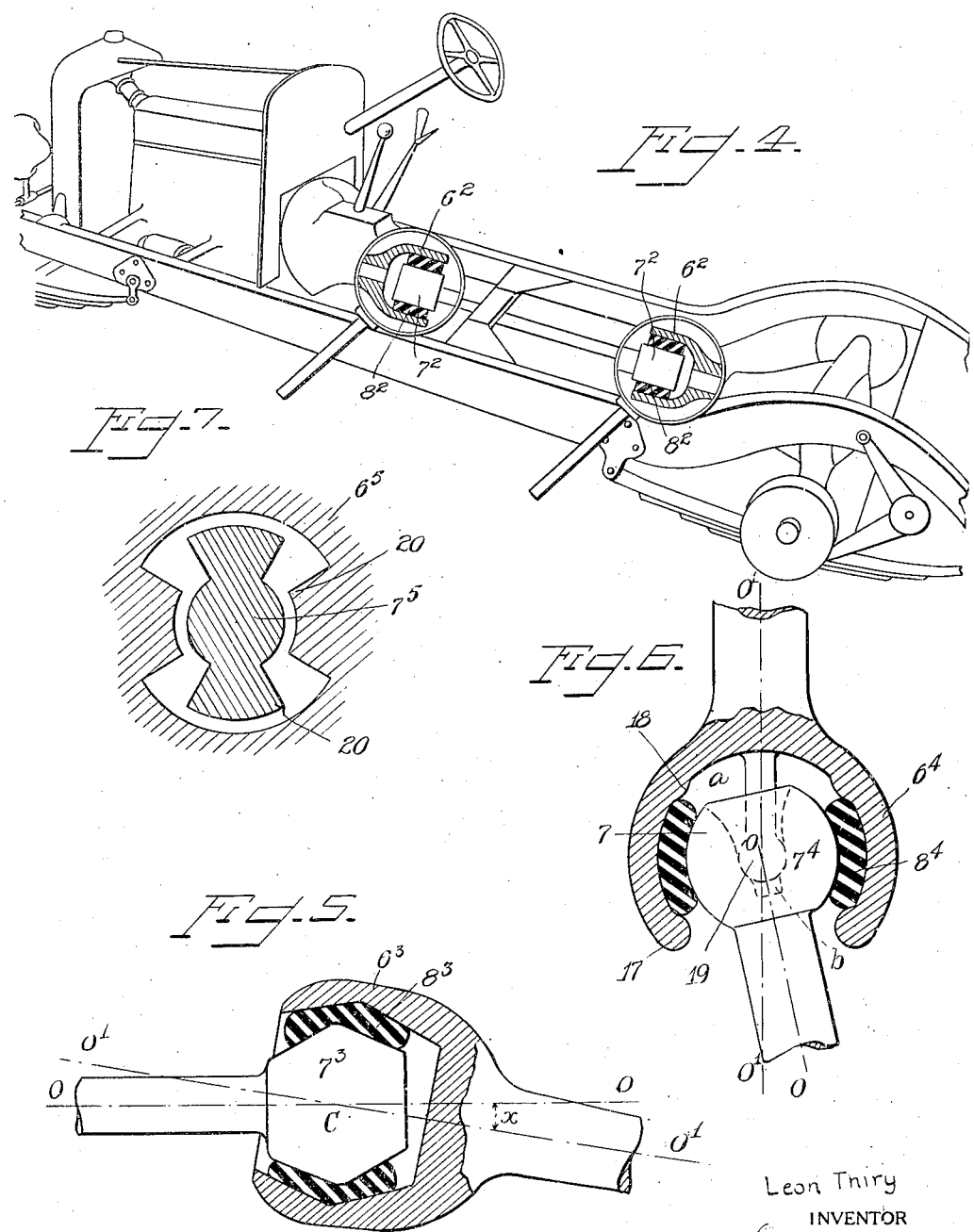

Patented June 11, 1935

2,004,712

UNITED STATES PATENT OFFICE 2,004,712

ELASTIC SHAFT COUPLING

Leon Thiry, Huy, Belgium

Application February 26, 1931, Serial No. 518,446
In France June 2, 1930

2 Claims. (Cl. 287—85)

My invention relates to elastic coupling sleeves for connecting two shafts which are not in perfect alinement, as well as to Cardan or universal joints, particularly such as are adapted, for example, to connect the motor to the differential of an automobile. The purpose of elastic couplings of this kind is to transmit the torque of the motor shaft to the shaft tubing, absorbing the shocks and jars and eliminating the surface frictions, which are replaced by molecular movements of an elastic substance such as rubber.

In my co-pending patent application, Serial Number 293,374, filed July 17, 1928, I disclose a coupling arrangement of this general character in which the elastic sleeve or joint is deformed radially in a manner to produce an axial elongation of the sleeve. The present invention is a modification and development of such earlier construction. According to the present invention the elastic sleeve of the joint is deformed radially by contraction of its radial thickness in such manner that the resulting deformations, due to the incompressibility of rubber, are localized in circular directions or in directions other than axial. Stated in other words, the deformation of the sleeve is such that its axial length is reduced as compared to its length when in a free state or remains constant, or in any event it is increased to a less extent than when the consecutive radial crushing deformation is directed in the longitudinal direction.

In one form of the invention the sleeve is elongated circularly by its engagement with a member having a greater diameter than the interior diameter of the sleeve in the free state; the sleeve may then be slit in a manner to assure perfect adherence thereof to the parts between which it is placed. It will be understood that the slitting becomes necessary if the outer diameter of the deformed sleeve is equal to or less than the interior diameter of the outer part or member, or it is necessary to compress the outer part, or to increase the diameter of the inner part or to adopt both measures at the same time.

The result may also be obtained by causing the filling, due to the radial compression of the elastic sleeve, of grooves, slots or cavities formed either in the outer rigid member, or in the inner rigid member, or in the mass of rubber in the free state, or in any two of these three parts or in all three.

In accordance with another feature of the invention the sleeve is arranged in a manner to prevent circular or axial displacement of the rubber caused, for example, by excessive movements which cause superficial slippage. This result may be obtained, for example, by means of grooves, slots or surface roughening fixing the rubber sleeve in a permanent manner, and provided in either or both of the rigid members between which the rubber sleeve is secured.

It is preferable, however, to provide these securing aids on only one of the rigid members, for example, on the inner member so that, in case of an exceptionally excessive stress there may nevertheless be slippage between the rubber and the outer member. If the securement were between the rubber and each of the two rigid members, such excessive stress might cause rupture of the rubber and perhaps its detachment at the same time from the two rigid members, which would finally free it and the effect would be the same as if no securing aids had been employed.

The slots, grooves or projections may be arranged in any desired plane, for example in the median plane, and they may be of grid form or any other desired form.

Inasmuch as the displacement which it is principally desired to prevent is axial displacement (parallel to the longitudinal axis or rotation of the cardan) it will be advantageous to place the grooves, slots, ribs or the like in planes perpendicular to the axis of rotation so that they create resistance only in the longitudinal direction. If desired, one of the rigid members for example, the inner member, or both members, may have enlarged ends.

The immovability of the sleeve may also be obtained by vulcanizing the rubber by any approved method, or by adhesion by means of any suitable cement or glue.

Figure 1A:
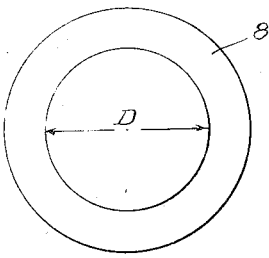
Figure 2:
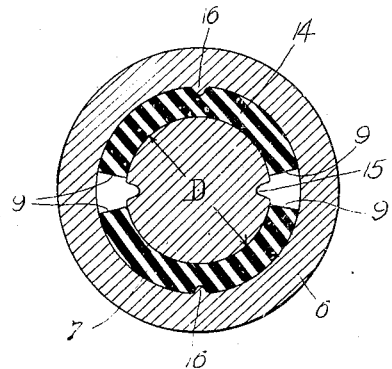
Figure 3:
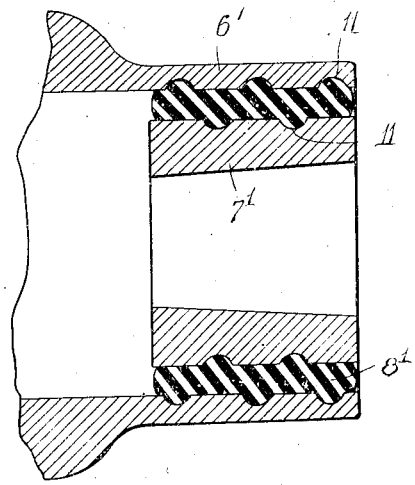
Figure 8:
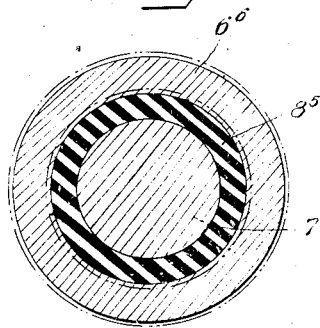
Figure 9:
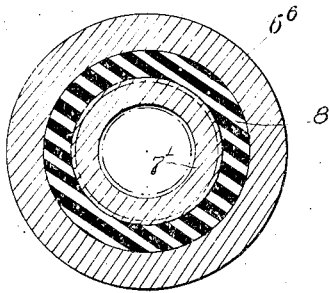

The invention is illustratively exemplified in the accompanying drawings in which Figure 1 shows the rubber ring in the free state; Figure 1a shows the ring after circular deformation; Figure 2 is a section at right angles to the axis of a sleeve embodying one form of the invention; Figure 3 is a longitudinal section of a modification in which the two members between which the sleeve is disposed are provided with grooves; Figure 4 shows an automobile transmission, the transmission shaft being coupled to the motor shaft and to the shaft of the differential by two joints embodying the invention, the joints being in section on an enlarged scale; Figure 5 is a vertical section of a Cardan joint having oppositely inclined truncated conical surfaces which permits of increasing the maximum value of the angle formed by the two shafts to be connected;

Figure 6 is a longitudinal section of a modification in which the double cones are replaced by a sphere and Figure 7 shows schematically the arrangement of securing means; Figure 8 is a transverse sectional view similar to that illustrated in Figure 2 with the exception that the rubber ring is continuous and adhesion is effected by merely contracting the outer member; Figure 9 is a similar view showing the inner member expanded after assembly.

Figure 2 shows a form of coupling sleeve construction in which the deformations of the elastic sleeve are localized in directions other than axial. To this end, a sleeve 8 of rubber which, in the free state (Figure 1) has a small interior diameter $d$, is placed about the interior rigid member 7 whose diameter is D. This results in a considerable increase in the interior diameter of the sleeve 8 thus reducing its radial thickness or width (Figure 1a). The sleeve may retain its initial length; the length may also be reduced according to $$\frac{d}{D}.$$

The assembly of the interior member 7 and of the rubber sleeve 8 thus deformed, is then introduced into the bore of the outside rigid member 6. The dimensions of the sleeve 8 and of the bore of the member 6 may be such that a slight play permits such introduction.

When the assembly is in place, the sleeve 8 is provided with two incisions 9 which may be diametrically opposite each other. The rubber sleeve thus separates into two parts which, under the effect of the natural reaction due to the initial deformation of the rubber, exercise very considerable force on the members 6 and 7, thereby assuring perfect adherence between the sleeve 8 and the members 6 and 7.

If the inner diameter of the outer member is less than the outer diameter of the deformed rubber, it will not be necessary to cut the latter, the new axial contraction of the elastic sleeve resulting from its introduction into the outer member being sufficient to assure the necessary adherence.

For reasons of symmetry the incisions 9 are preferably made diametrically opposite each other, but it is within the purview of the invention to provide but a single incision or two incisions at 180° to each other or three incisions at 120° to one another, and so on, the incisions being made in a manner to preserve equilibrium which is essential for high speeds.

The space which occurs between the walls where the incisions are made will preferably be filled with rubber flowed into place or with any other analogous plastic material devoid of initial tension.

In Figure 2 the member 7 is shown as provided with two grooves 15 into which may be introduced the blades of a knife or of shears, or an electrically heated metal wire or any other suitable means for easily cutting the rubber sleeve at the desired time. It will be understood that the grooves 15 may be formed in the member 6 as well as in the member 7.

The outer member 6 may have its bore provided with suitable means for immovably retaining the rubber when it is released by the cut or cuts 9. Such means may comprise ribs 16, or pins or points or grooves, or as a substitute for any of these I may use size or subject the rubber to partial vulcanization. The retaining means will preferably be arranged equidistantly from the two cuts 9 and symmetrically to one another.

In lieu of obtaining the desired adherence by cutting the rubber, the result may be obtained by compressing the outer member or increasing the diameter of the inner member by any suitable means such as matrices, presses or the like.

An example of this construction is illustratively exemplified in Figure 8, in which the outer tube $6^6$ has been contracted, between rollers or other well known means, into contact with the continuous rubber ring $8^5$ after assembly of the parts.

Figure 3 shows another form in which the deformations of the elastic sleeve are localized in directions other than axials. To this end, the rigid outer member 6' or the rigid inner member 7', or the mass of the sleeve 8' in its free state or any two or all three of these parts are provided with slots, grooves or cavities 11 which are adapted to receive the rubber in excess, forced out at the moment of radial compression.

Figures 4, 5 and 6 illustratively exemplify various mechanical applications of the elastic coupling sleeve operating as Cardan joints and having the properties described above.

In the Cardan joint of Figure 4, the inner member $7^2$ and the outer member $6^2$ have cylindrical surfaces, this Cardan joint assuring the connections between the motor and the differential of an automobile vehicle.

The members $6^3$ and $7^3$ of the Cardan joint shown in Figure 5 have oppositely inclined truncated conical surfaces.

The possibilities of angular displacement of the two shafts connected to these members are naturally greater for the same axial length of rubber than with the cylindrical form, because the angle $x$ which the shaft 00 may assume to the shaft $0^1 0^1$ will naturally be larger, all other conditions being equal, than with a cylindrical construction.

The developments of the cones will advantageously be disposed tangentially to circles having as their centre the center C of oscillation of the Cardan joint.

Figure 6 shows a modification of the invention in which the double cones are replaced by a sphere, which represents the ideal form. The double truncated cone has the advantage of being more easily machined, while presenting sufficient mobility and a better tendency to localize the rubber in the central part without requiring recourse to the securing methods described above. At 17 and 18 are projections or irregularities arranged in planes perpendicular to the axis of rotation so as to create resistances to axial displacement.

Naturally these securing methods prevent the axial displacement of the rubber and the means for localizing the deformations in directions other than axial are applicable to the cylindrical form as well as to the truncated conical or spherical forms.

At 19 is disclosed means for mechanically centering the constituent parts of the Cardan joint, this means comprising for example, a ball and socket joint of any suitable material, preferably metal. This ball and socket joint merely acts as a centering means and not for the purpose of transmitting force or power. The chambers $a$ and $b$ which receive the joint 19 may, either or both, be provided with lubricant which may be introduced into the chambers at the time of assembly of the parts or at any subsequent time, by any suitable lubricating device with or without pressure. The lubricant to be used will either be such as not to affect the rubber, or the chemical composition of the rubber should be such that the latter is immune to attack by the usual lubricants.

The several forms of the invention shown and described are by way of example only and it will be apparent that other arrangements embodying the principle of the invention may be used.

The couplings and Cardan joints embodying the present invention are particularly well suited to form the connection between the starter and the engine of automobiles as well as the connection between the engine and the differential (Figure 4). The latter application also contemplates the transmission of motion to the front wheels. The Cardan joints may be placed at any desired point of the transmission connecting the engine to the wheels.

It will be understood that the couplings of the present invention may be used for any type of Cardan or universal joint, to control brakes or for any other use in which the Cardan or universal joint permits of eliminating maintenance, wear and lubrication, its elasticity absorbing violent shocks and consequent vibrations. The coupling is very silent and in most cases it permits of slippage in case of excessive loads, but such slippage is exceptional as otherwise destruction of the rubber would be certain to follow. Safety means may also be provided for assuring a substitute connection between the shafts in case of destruction of the rubber sleeve. Figure 7 shows, by way of example, such safety arrangement permitting the outside member $6^5$ to be connected to the inner member $7^5$ in case the elastic material interposed therebetween is destroyed. The projections 20 of the parts $6^5$ and $7^5$ only come into contact if, for some reason, the elastic material has deteriorated, and in that case, one of the parts $6^5$ or $7^5$ entrains the other in its movement.

I claim:

1. An elastic joint comprising a rigid inner piece, an elastic ring stretched on said inner piece in order that the mean diameter of said ring be greater than when said ring is in the free state, and an outer rigid piece surrounding said elastic ring, said elastic ring being provided with at least one longitudinal cut made after insertion of said ring between said inner and outer pieces.

2. An elastic joint comprising a rigid inner piece, an elastic ring stretched on said inner piece in order that the mean diameter of said ring be greater than when said ring is in the free state, an outer rigid piece surrounding said elastic ring, said ring being provided with at least one longitudinal cut made after insertion of said ring between said inner and outer pieces and a plastic filling in said cut.

LEON THIRY.